(12) United States Patent
Tovar et al.

(10) Patent No.: US 8,789,439 B2
(45) Date of Patent: Jul. 29, 2014

(54) DEVICE FOR OPERATING FUNCTIONS OF A MOTOR VEHICLE

(75) Inventors: Johannes Tovar, Ingolstadt (DE); Ulrich Beierlein, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/805,540

(22) PCT Filed: Jun. 15, 2011

(86) PCT No.: PCT/EP2011/002931
§ 371 (c)(1),
(2), (4) Date: Mar. 4, 2013

(87) PCT Pub. No.: WO2011/157405
PCT Pub. Date: Dec. 22, 2011

(65) Prior Publication Data
US 2013/0186226 A1    Jul. 25, 2013

(30) Foreign Application Priority Data
Jun. 19, 2010  (DE) .......................... 10 2010 024 388

(51) Int. Cl.
| | |
|---|---|
| *B60K 6/00* | (2006.01) |
| *B60K 20/00* | (2006.01) |
| *G05G 9/00* | (2006.01) |
| *F16H 59/04* | (2006.01) |
| *F16H 59/08* | (2006.01) |
| *B60T 7/08* | (2006.01) |
| *G05G 1/04* | (2006.01) |
| *F16H 59/02* | (2006.01) |
| *F16H 63/34* | (2006.01) |
| *F16H 63/48* | (2006.01) |

(52) U.S. Cl.
CPC ................ *F16H 59/08* (2013.01); *B60T 7/085* (2013.01); *G05G 1/04* (2013.01); *F16H 59/0278* (2013.01); *F16H 63/3458* (2013.01); *F16H 63/48* (2013.01)
USPC ....................... 74/473.3; 74/473.1; 74/473.19

(58) Field of Classification Search
CPC ...... B60K 37/06; B60K 41/26; B60K 41/262; B60K 41/264; B60T 7/047; B60T 7/10; B60T 7/101; B60T 7/102; B60T 7/105; B60T 7/085; B62K 23/06; G05G 1/04; G05G 1/06; F16H 59/02; F16H 59/0204; F16H 59/0217; F16H 59/0278; F16H 59/08; F16H 59/01; F16H 59/012; F16H 63/3458; F16H 63/48
USPC ................... 74/473.1, 473.12, 473.19, 473.3, 74/473.31, 502, 519, 523, 524, 525, 538, 74/473.21, 473.22, 473.23, 473.24; 200/61.87, 61.88, 61.91, 547, 548, 200/549, 550, 551, 308
See application file for complete search history.

(56) References Cited

U.S. PATENT DOCUMENTS 2,666,338 A * 1/1954 Sandberg ....................... 74/503
2,722,578 A   11/1955 Schmiege et al.
(Continued)

FOREIGN PATENT DOCUMENTS

DE   100 02 441   8/2001
DE   101 05 633   8/2002
(Continued)

OTHER PUBLICATIONS

International Search Report for PCT/EP2011/002931, mailed on Apr. 19, 2012.
International Preliminary Report on Patentability for PCT/EP2011/002931.

*Primary Examiner* — Troy Chambers
*Assistant Examiner* — Jake Cook
(74) *Attorney, Agent, or Firm* — Staas & Halsey LLP

(57) ABSTRACT

A device for operating functions of a motor vehicle has an operator control element which serves to control a transmission of the motor vehicle. A switching element for activating and/or releasing a parking brake of the motor vehicle is arranged on the operator control element.

19 Claims, 2 Drawing Sheets

(56) References Cited

U.S. PATENT DOCUMENTS

| | | | |
|---|---|---|---|
| 5,809,841 A * | 9/1998 | Smith | 74/531 |
| 5,897,173 A * | 4/1999 | Hardin | 303/3 |
| 6,621,176 B1 * | 9/2003 | Nagasaka et al. | 307/9.1 |
| 2005/0023888 A1 * | 2/2005 | Knight | 303/7 |
| 2005/0056109 A1 * | 3/2005 | Kim | 74/473.3 |
| 2011/0277578 A1 * | 11/2011 | McGuire et al. | 74/473.3 |

FOREIGN PATENT DOCUMENTS

| | | |
|---|---|---|
| DE | 10 2007 037 707 | 2/2009 |
| DE | 11 2007 002 128 | 7/2009 |
| DE | 10 2010 024 338.4 | 6/2010 |
| GB | 2460659 | 12/2009 |
| WO | 2009/018823 | 2/2009 |
| WO | 2010/039845 | 4/2010 |
| WO | PCT/EP2011/002931 | 6/2011 |

* cited by examiner

DEVICE FOR OPERATING FUNCTIONS OF A MOTOR VEHICLE

CROSS REFERENCE TO RELATED APPLICATIONS

This application is based on and hereby claims priority to International Application No. PCT/EP2011/002931 filed on Jun. 15, 2011 and German Application No. 102010024388.4 filed on Jun. 19, 2010, the contents of which are hereby incorporated by reference.

BACKGROUND

The invention relates to a device for operating functions of a motor vehicle.

A device of this type is known from WO 2010/039845 A2. In this case, multiple actuating knobs are attached to a shift selection lever, which can be used, inter alia, to start the motor or to actuate the parking brake.

GB 2 460 659 A describes an actuating lever for a vehicle, which can be adjusted between multiple positions. Multiple switches are attached to the actuating lever, which are assigned in particular to hydraulic functions of the vehicle.

An actuating button for starting a motor of a motor vehicle is described in U.S. Pat. No. 2,722,578 A. It can be attached to a shift lever connected to the steering column.

WO 2009/018823 A1 describes an actuating unit for selecting shift steps of a transmission, in which an actuating element for activating a parking lock is arranged on a gear selection element.

A driver assistance device is known from DE 11 2007 002 128 T5. This device has a gear shift lever, i.e., an operating element for controlling the transmission of the motor vehicle, which is provided, inter alia, with a fixing unit for activating or deactivating the actuation of functions of the gear shift lever.

A large problem in modern motor vehicles is the manifold different operating elements which are arranged in the interior of the motor vehicle to be able to operate the greatly varying functions thereof. This results in a substantial consumption of space and typically very difficult operability of the individual functions, since the operating elements are frequently not logically arranged.

SUMMARY

It is one possible object to provide a device for operating functions of a motor vehicle, which offers assistance with the above-described problems with respect to the distribution of operating elements within a motor vehicle.

The inventors propose a device for operating functions of a motor vehicle. The device has an operating element to control a transmission of the motor vehicle, and a brake switch element to actuate and/or disengage a parking brake of the motor vehicle. The brake switch element is arranged on the operating element such that the brake switch element is located in different positions with respect to the operating element depending on whether the parking brake is actuated or disengaged, with a part of the brake switch element protruding outside the operating element when the parking brake is actuated. The brake switch element has a marking, which when the parking brake is actuated, is located in a visible position protruding outside the operating element Through the arrangement of a switch element for actuating and disengaging a parking brake of the motor vehicle on the operating element used to control the transmission, bundling of the operating elements results which are used to control the most important driving functions of the motor vehicle. Since the driver must actuate the operating element for the control of the transmission in any case when starting and also when shutting down the motor vehicle, arranging the switch element used to actuate and disengage the parking brake on this same operating element represents a very simple possibility for the driver to simultaneously also actuate the parking brake when shutting down the motor vehicle.

A further advantage achieved is that no additional installation space is consumed for the switch element used to actuate and/or disengage the parking brake, since typically there are no additional switches or the like located on the operating element used to control the transmission, so that this location can be utilized without problems. The space which becomes free in the central console by arranging the switch element for actuating and/or disengaging the parking brake on the operating element used to control the transmission can be utilized better by other components, for example a cupholder or the like.

In order to provide the driver with an optical display with respect to the actuating state of the parking brake, it is further provided that the switch element is located in different positions as a function of whether the parking brake is actuated or disengaged.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
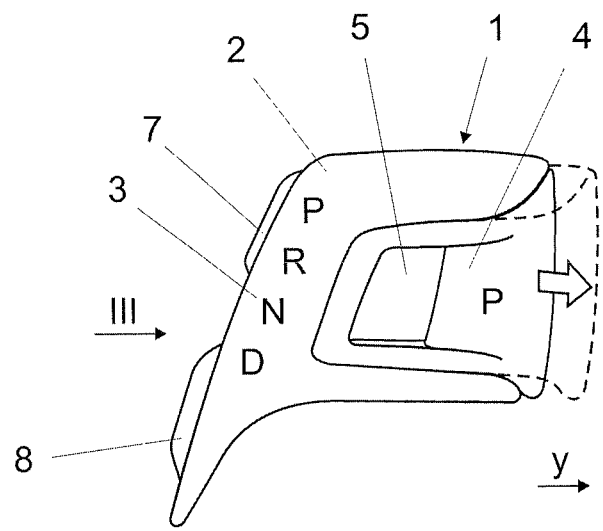
FIG. 1 shows one embodiment of the proposed device in a first state.

Reference will now be made in detail to the preferred embodiments of the present invention, examples of which are illustrated in the accompanying drawings, wherein like reference numerals refer to like elements throughout.

FIG. 1 shows a device 1 for operating various functions of a motor vehicle, which has an operating element 2 used to control a transmission (not shown) of the motor vehicle. To select the four individual gear steps of the transmission, which are designated in the present case with "P", "R", "N", and "D", the operating element 2, which can also be designated as a gear step selection element or shift lever, is moved in a way known per se in the longitudinal direction of the motor vehicle, which is designated with "x". In the illustrated exemplary embodiment, it is provided that the operating element 2 moves back into a center position after the selection of a gear step. This is thus a so-called monostable operating element 2. However, in one embodiment (not shown), it can also be provided that the operating element 2 can be displaced in a way known per se within a shift gate or shift guide plate. The choice of the respective gear can be performed in the present case via levers (not shown) on a steering wheel of the motor vehicle or, with appropriate embodiment of the operating element 2, also by the operating element 2 itself.

In the illustrated exemplary embodiment, the operating element 2 has no mechanical connection to the transmission, it is preferably a so-called shift-by-wire transmission. A display 3 is attached in the lateral region of the operating element 2, in which the respective engaged gear step of the transmission is displayed. The display 3 for the gear steps can alternatively also be provided on the top side of the operating element 2 and/or in a display within the dashboard (not shown). In principle, the operating element 2 could also be the gear shift lever of a manual shift transmission.

A switch element 4 for actuating and/or disengaging a parking brake, in particular an electronic parking brake, of the motor vehicle is provided in the top region of the operating element 2. In the illustration of FIG. 1, the switch element 4 is located in a first state, in which the parking brake is disengaged. A cavity 5 in the switch element 4 is used for the engagement and ensures easy actuation thereof, for which the switch element 4 is pressed laterally outward in the direction of the arrow "y".

Figure 2:
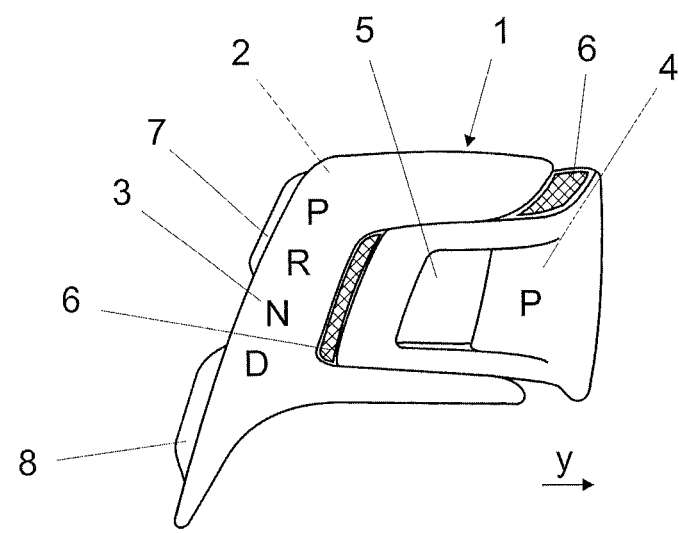
FIG. 2 shows the device from FIG. 1 in a second state.

FIG. 2 shows the switch element 4 for actuating and/or disengaging the parking brake in a second state, in which the parking brake is actuated. It can be recognized that the switch element 4 is located in a different position in the actuated state of the parking brake than in the non-actuated state thereof, i.e., there is a difference in the mechanical arrangement of the switch element 4 between these two positions. Furthermore, FIG. 2 shows that in the position of the switch element 4 corresponding to the actuated state of the parking brake, a part of the switch element 4 is located outside the operating element 2, whereby it is optically signaled to the occupants of the motor vehicle that the parking brake is actuated and the motor vehicle is not ready to drive. Furthermore, the switch element 4 has at least one, in the present case two, markings 6, which are implemented in particular as colored, and which are located in a visible position outside the operating element 2 in the position of the switch element 4 corresponding to the actuated state of the parking brake. In contrast, the marking 6 is not externally visible in the position according to FIG. 1. The marking 6 thus amplifies the above-described optical signal of the actuated state of the switch element 4. To disengage the parking brake, the switch element 4 is pressed back inward into the first state according to FIG. 1.

Figure 3:
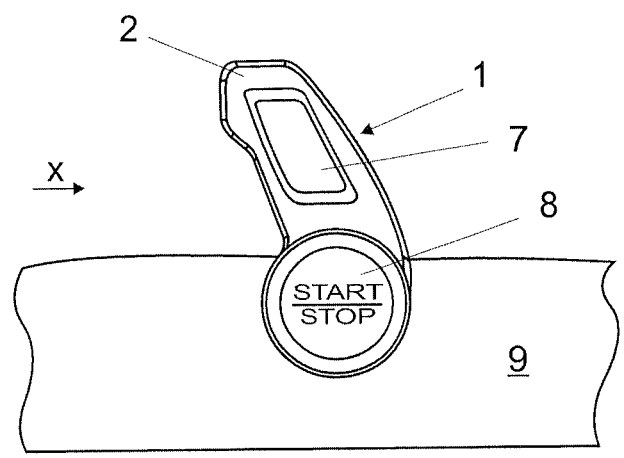
FIG. 3 shows a side view of the device according to arrow III from FIG. 1.

As is clear from FIG. 3, the operating element 2 of the device 1 has a button 7, which is arranged in this case in a lateral region thereof, for releasing the switch functions, which must be actuated before the selection of a gear step by the operating element 2. A gear step can be selected using the operating element 2 only after this actuation. The button 7 can optionally also be omitted.

A further switch element 8 for starting and/or stopping a drive motor of the motor vehicle is integrated in the operating element 2 of the device 1, whose function can be implemented in a way known per se. It is advantageous that therefore all operating switches which are required or used for operating the most important driving functions of the motor vehicle are located in direct proximity to one another, whereby the operation is made easier, on the one hand, and more space is available in the region of a central console 9, on which the device 1 is arranged, on the other hand. In one embodiment (not shown) of the device 1, one of the two switch elements 4 or 8 can be omitted.

Figure 4:
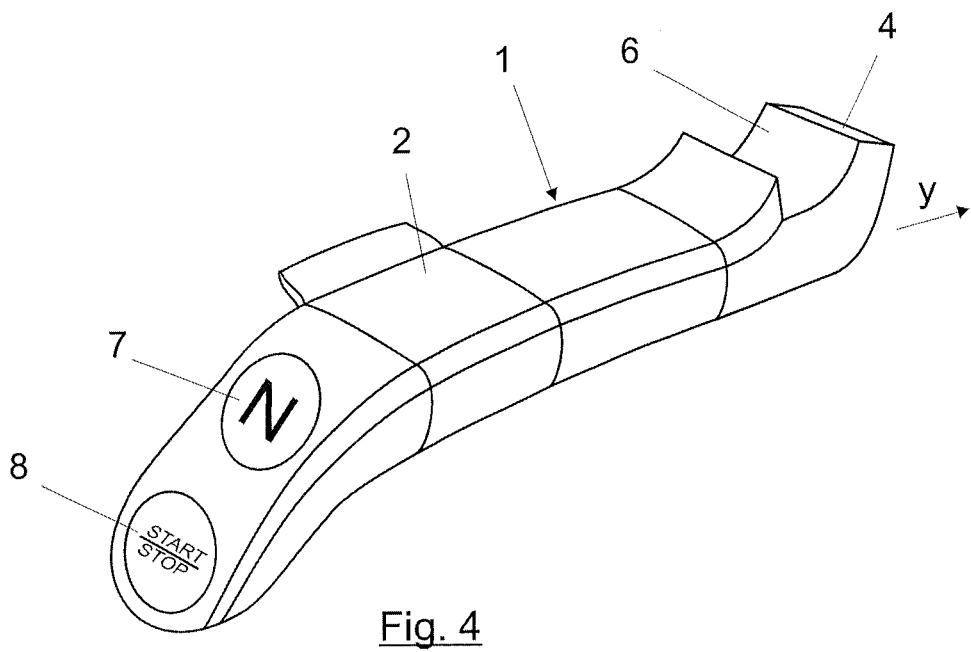
FIG. 4 shows an alternative embodiment of the device in the state according to FIG. 2.

FIG. 4 shows an alternative embodiment of the device 1, in which the operating element 2 for controlling the transmission is designed in the form of a handle. The button 7 for releasing the switch functions is located in this case on the side of the operating element 2 facing toward the driver. The switch element 8 for starting and/or stopping the drive motor of the motor vehicle is arranged below the button 7. The switch element 4 for actuating and/or disengaging the parking brake is located on the opposite side and is actuated similarly to the embodiment described with reference to FIGS. 1 to 3.

In an embodiment which is particularly advantageous for electric motor vehicles, the selection of the gear step "P" for "parking" by the operating element 2 can have the result that the switch element 4 for actuating and disengaging the parking brake is automatically actuated and the drive motor of the motor vehicle automatically stops. Undesired starting of the drive motor, caused by a short-circuit, for example, is thus prevented.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide V. DIRECTV, 69 USPQ2d 1865 (Fed. Cir. 2004).

The invention claimed is:

1. A motor vehicle device for operating functions of a motor vehicle, comprising:
    an operating element to control a transmission of the motor vehicle; and
    a brake switch element to actuate and/or disengage a parking brake of the motor vehicle, the brake switch element being arranged on the operating element such that the brake switch element is located in different positions with respect to the operating element depending on whether the parking brake is actuated or disengaged, with a part of the brake switch element protruding outside the operating element when the parking brake is actuated,
    wherein the brake switch element has a marking, which when the parking brake is actuated, the marking is located in a visible position protruding outside the operating element, and
    when the parking brake is disengaged, the marking is located in a position which is not externally visible.

2. The motor vehicle device according to claim 1, wherein the brake switch element has a cavity, to manually engage with the brake switch element and to manually displace the brake switch element with respect to the operating element.

3. The motor vehicle device according to claim 1, further comprising a motor switch element to start and/or stop a drive motor of the motor vehicle, the motor switch element being arranged on the operating element.

4. The motor vehicle device according to claim 1, wherein the operating element has no mechanical connection to the transmission.

5. The motor vehicle device according to claim 1, wherein
    the operating element has a central position and at least two control positions, with respect to a mounting base,
    the transmission is controlled when the operating element is moved to one of the control positions, and
    the operating element returns to the central position after controlling the transmission at one of the control positions.

6. The motor vehicle device according to claim 1, further comprising a display panel located on the operating element to display a currently engaged gear step of the transmission.

7. The motor vehicle device according to claim 1, wherein when the parking brake is disengaged, the brake switch element forms a smooth surface contour for the operating element such that no part of the brake switch element protrudes from the operating element.

8. The motor vehicle device according to claim 1, further comprising a mounting base to mount the operating element on a central console of the motor vehicle.

9. The motor vehicle device according to claim 1, further comprising a release button located on the operating element, such that actuating the release button allows the operating element to move with respect to a mounting base, to thereby control the transmission.

10. The motor vehicle device according to claim 2, further comprising a motor switch element to start and/or stop a drive motor of the motor vehicle, the motor switch element being arranged on the operating element.

11. The motor vehicle device according to claim 10, wherein the operating element has no mechanical connection to the transmission.

12. The motor vehicle device according to claim 11, wherein
the operating element has a central position and at least two control positions, with respect to a mounting base,
the transmission is controlled when the operating element is moved to one of the control positions, and
the operating element returns to the central position after controlling the transmission at one of the control positions.

13. The motor vehicle device according to claim 12, further comprising a display panel located on the operating element to display a currently engaged gear step of the transmission.

14. The motor vehicle device according to claim 13, wherein when the parking brake is disengaged, the brake switch element forms a smooth surface contour for the operating element such that no part of the brake switch element protrudes from the operating element.

15. The motor vehicle device according to claim 2, further comprising a mounting base to mount the operating element on a central console of the motor vehicle.

16. The motor vehicle device according to claim 2, further comprising a release button located on the operating element, such that actuating the release button allows the operating element to move with respect to a mounting base, to thereby control the transmission.

17. The motor vehicle device according to claim 1, wherein the brake switch element actuates the parking brake via a force which presses the brake switch element laterally outward from a cavity disposed in the operating element, and
the brake switch element disengages the parking brake through a force which presses the brake switch element laterally inward toward the cavity.

18. The motor vehicle device according to claim 1, wherein the operating element is displaced in a longitudinal direction of the motor vehicle to control the transmission, and
the brake switch element protrudes outside the operating element in laterally outward direction, when the parking brake is actuated.

19. The motor vehicle device according to claim 1, further comprising:
a motor switch element to start and/or stop a drive motor of the motor vehicle, the motor switch element being arranged on a first end of the operating element; and
a release button disposed on a first side of the operating element facing toward a position in the motor vehicle occupied by a driver, the actuation of the release button allowing the operating element to select a gear step of the transmission,
wherein the brake switch element is disposed on a second end of the operating element, opposite of the first end,
the motor switch element is disposed on the first side of the operating element adjacent to the release button, and
the release button is disposed between the motor switch element and the brake switch element.

* * * * *